United States Patent [19]

Armour et al.

[11] 4,009,980
[45] Mar. 1, 1977

[54] INJECTION BLOW MOLDING MACHINE HAVING MOVABLE PARISON PINS

[75] Inventors: Donald F. Armour, Bloomfield, Conn.; William B. Niemi, East Longmeadow, Mass.

[73] Assignee: Package Machinery Company, East Longmeadow, Mass.

[22] Filed: July 23, 1975

[21] Appl. No.: 598,330

[52] U.S. Cl. .......................... 425/242 B; 425/391; 425/DIG. 213; 425/DIG. 216
[51] Int. Cl.² .......................................... B29C 17/07
[58] Field of Search ............. 425/DIG. 216, 242 B, 425/387 B, 319, 391, DIG. 209, DIG. 213

[56] References Cited
UNITED STATES PATENTS

| | | | |
|---|---|---|---|
| 2,834,154 | 5/1958 | Koob | 425/387 |
| 3,776,991 | 12/1973 | Marcus | 425/DIG. 216 |
| 3,801,690 | 4/1974 | Gilbert | 425/DIG. 216 |
| 3,905,738 | 9/1975 | Farrell | 425/DIG. 216 |

*Primary Examiner*—Richard B. Lazarus
*Attorney, Agent, or Firm*—McCormick, Paulding & Huber

[57] ABSTRACT

In an injection blow molding machine, parisons are stretched and twisted as they are moved between the parison mold and the blow mold by extending and rotating the parison pins. The stretching and twisting of the parison prior to the blowing operation permits larger containers with smaller finishes to be produced and also permits the finished article to be stronger by regulating the molecular arrangement in the plastic material forming the article.

8 Claims, 2 Drawing Figures

INJECTION BLOW MOLDING MACHINE HAVING MOVABLE PARISON PINS

BACKGROUND OF THE INVENTION

The present invention relates to injection blow molding apparatus and techniques, and more particularly, is concerned with method and apparatus which cause a parison to be stretched or rotated as it is moved between the parison and blow molds.

In the blow molding of articles from a plasticized material, it is difficult to produce an article such as a bottle having a relatively large height compared to its diameter or finish unless the parison mold has a similar dimensional ratio. Also, forming a parison on a pin in the parison mold with a relatively high length to diameter ratio requires accurate positioning of the pin within the cavity of the parison mold, otherwise, nonuniform wall thicknesses may be produced and such nonuniformity may be intolerable in thin walled bottles or tubes.

It is also desirable to control the molecular arrangement or orientation in the finished article in order to develop maximum strength. Such control can be exercised by appropriate stretching and twisting of the parison while the settable material forming the parison is still in a semi-fluid state at specific temperatures depending upon the material being used.

Both of the above problems may be solved in accordance with the present invention by stretching a relatively short parison axially of itself prior to the blowing operation so that an elongated parison is placed in the blow mold with the molecular chains generally aligned with the direction in which the parison is being stretched. Simple stretching of the parison prior to or during a blowing operation is taught in U.S. Pat. Nos. 2,834,154 and 3,244,778. In the prior art patents, however, the specific apparatus employed during the formation of the parison is relatively unique and hence, not adaptable to the more conventional injection blow molding machines in which a parison is completely formed in a parison mold and then is transferred to the blow mold for expansion to its final form.

Additionally, it is desirable to control the orientation of the molecular chains in the plastic material more precisely than that which occurs when the parison is merely stretched axially of itself. Control of the temperature of the parison and the twisting of the parison enable the molecular arrangement in the finished article to be further regulated for a broader choice of results.

Accordingly, it is an object of the present invention to provide a method and apparatus by which the molecular arrangement of a plastic article may be controlled in an injection blow molding machine. It is a further object of the invention to provide a method and apparatus for forming bottles and similar articles which have relatively large heights compared to their diameters or finishes.

SUMMARY OF THE INVENTION

The present invention resides in a method and apparatus for injection blow molding an article such as a bottle, a closed-end tube or similar articles. In particular, the invention is suited to the formation of articles which have relatively long lengths or axially dimensions compared to their transverse or diametral dimensions.

The apparatus which carries out the method of the present invention is incorporated in a conventional injection blow molding machine. In the conventional machine an injection nozzle cooperates with a parison mold to inject a quantity of settable material into the mold cavity. The settable material is commonly a plastic such as polystyrene having long chain molecules. A parison pin is supported in the mold cavity by an indexible parison arm and the settable material is injected over the pin to form a parison having a configuration determined by the contours of the mold cavity. A neckring mounted on the parison arm around the base of the pin forms the neck portion or finish of the article.

Once formed, the parison is moved on the parison pin from the parison mold to the cavity of the blow mold which defines the final contour of the article. In a blowing step, the parison is expanded against the walls of the cavity.

In accordance with the present invention, the parison is stretched after removal from the parison mold and before the blowing step. The length to which the parison is stretched is greater than that which can be accommodated by the parison mold and preferably approximates the final axial length or height of the article between its base and its finish formed by the neckrings. The stretching is produced by moving the parison pin axially of itself relative to the parison arm and the neckring, and such movement may be produced by any suitable means such as a hydraulic actuator mounted within the parison arm. In one embodiment of the invention, a pair of coaxially arranged parison pins are mounted on opposite sides of the parison arm for simultaneous indexing movements between the parison and blow molds. By interconnecting the coaxially arranged parison pins, one of the parison pins is extended during movement from the parison mold to the blow mold while the other parison pin is retracted during movement from the blow mold to the parison mold.

The parison pins are also provided with temperature control means for maintaining the settable material at a desired or preselected temperature permitting molecular orientation to accompany the stretching of the parison. Additionally, means are provided for rotating the parison pin as it stretches the parison so that the parison is twisted. Orientation of the molecular chains in the final article can thus be controlled with a greater degree of flexibility.

Thus, the apparatus permits articles having dimensions substantially greater than the parison mold to be formed and at the same time permits the molecular arrangement in the settable material to be more accurately controlled.

DESCRIPTION OF THE PREFERRED EMBODIMENTS

Figure 1:
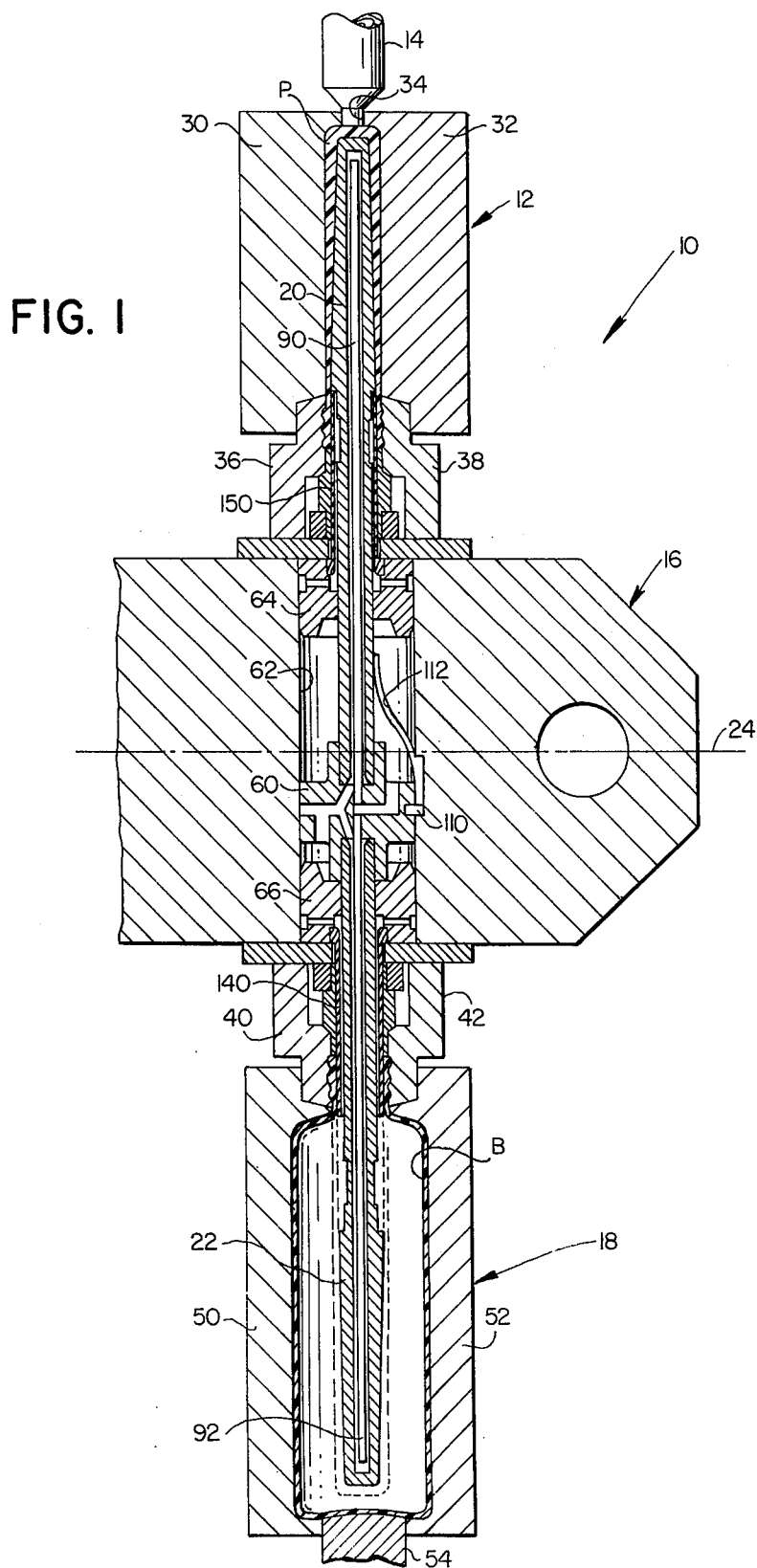
FIG. 1 is a cross-sectional view of an injection blow molding machine showing both the parison mold and the blow mold and includes one embodiment of the apparatus of the present invention.

FIG. 1 discloses in section an injection blow molding machine, generally designated 10, having a parison mold 12, a cooperating injection nozzle 14, a rotatable head or parison arm 16, and a blow mold 18 situated on the side of the arm opposite the parison mold. The head 16 supports a pair of coaxially arranged parison pins 20 and 22 and rotatably indexes these pins between the parison mold 12 and the blow mold 18 about the axis 24. For purposes of description, it is assumed that the molding machine 10 is utilized to form a plastic bottle B as shown within the blow mold 18. The bottle has a relatively long axial length or height compared to its lateral dimensions and finish diameter. It will also be noted that the axial length of the bottle B is substantially greater than the corresponding axial length of the parison P formed in the parison mold 12.

The parison mold 12 is a split mold comprised of mold halves 30 and 32. The mold halves form the cavity defining the parison shape and an interconnecting sprue 34 engaged by the nozzle 14 and through which a settable plastic material is injected into the cavity. A pair of neckring segments 36, 38 surrounding the base of the parison pin 20 are attached to the parison arm 16 and generate the neck portion or finish of the parison P. A corresponding pair of neckring segments 40 and 42 are attached to the opposite side of the parison arm 16 and surround the parison pin 22. The neckring segments remain closed and serve to support and hold the parison P and the blown bottles B on the arm 16 until the bottles are stripped from the pins at the completion of the blowing process.

The blow mold 18 like the parison mold 12 is also a split mold comprised of mold halves 50 and 52. When closed and locked up, the mold halves form a cavity defining the final form of the bottle B in conjunction with the neckring segments and a stationary base pad 54. While the bottle may have any desired final shape, the present invention is specifically designed for bottles and, correspondingly, blow molds which have relatively large axial dimensions compared to the lateral or diametral dimensions.

In a conventional blow molding process and in the blow molding process in accordance with the present invention, a quantity of settable material, such as polystyrene, is first injected into the closed and locked up parison mold 12 to form the parison P. Thereafter, the parison mold halves 30 and 32 split or open and the parison is rotated about the axis 24 and into the then-open mold halves 50 and 52 of the blow mold 18. The blow mold halves then close and air or an inert gas such as carbon dioxide is blown into the parison from the arm 16 so that the parison is expanded against the walls of the cavity in the blow mold to assume the final form of the bottle B. The blow mold and the neckring segments then open and the finished bottle B is stripped from the parison pin. The parison pin is then returned to a position between the parison mold halves 30 and 32 by rotatably indexing the arm 16, and the mold halves close and lock up for injection of more settable material to repeat the molding process.

With the two parison pins 20 and 22 mounted on the arm 16 in coaxial relationship, one of the pins indexes 180° from the parison mold 12 to the blow mold 18 while the other of the pins indexes 180° from the blow mold 18 to the parison mold 12. Each pin carries a parison from the parison mold to the blow mold and returns to the parison mold in a complete mold cycle. Thus, two complete bottles are produced during each cycle. The number of bottles produced during a cycle can be multiplied by increasing the pairs of parison pins and the corresponding parison and blow molds as shown, for example, in U.S. Pat. No. 3,816,050 issued to W. B. Niemi having the same assignee as the present application.

In accordance with the present invention, the parison pins 20 and 22 are mounted on the parison arm 16 so that they may extend and retract respectively relative to the arm during the indexing movements between the parison and blow molds. In addition, the pins are rotated about their common axes as they extend and retract and means are provided for controlling the temperatures of the pins. Thus, the parison P is stretched or elongated and also is twisted during its movement between the parison and blow molds. The temperature of the parison pins is controlled to preferably cool the pins and the parisons to a desired temperature which promotes uniform elongation or twisting and allows a desired molecular orientation to take place.

The actuating mechanism for reciprocating the parison pins 20 and 22 to produce the extension and retraction as described is enclosed within the parison arm 16. In one form, this mechanism is a hydraulic actuating mechanism including a piston 60 in which the base ends of the opposed parison pins are fixedly mounted. The piston slides within a cylindrical bore 62 extending through the arm between the cylinder ends 64 and 66 fixedly attached to the arm 16. The parison pin 20 has its base end secured to one side of the piston 60 and extends through the cylinder end 64 and outwardly through the neckring segments 36 and 38 into the cavity of the parison mold 12 in cantilever fashion. Correspondingly, the base of the parison pin 22 is secured to the opposite side of the piston 60 and extends outwardly through the cylinder end 66 and through the neckring segments 40 and 42 into the cavity of the blow mold 18 in cantilever fashion. When the pins 20 and 22 are removed from the molds 12 and 18, they are reciprocated and rotated relative to the parison arm 16 in accordance with pressures developed by a hydraulic fluid on opposite sides of the piston 60 and cause the desired stretching and twisting of the parisons.

Figure 2:
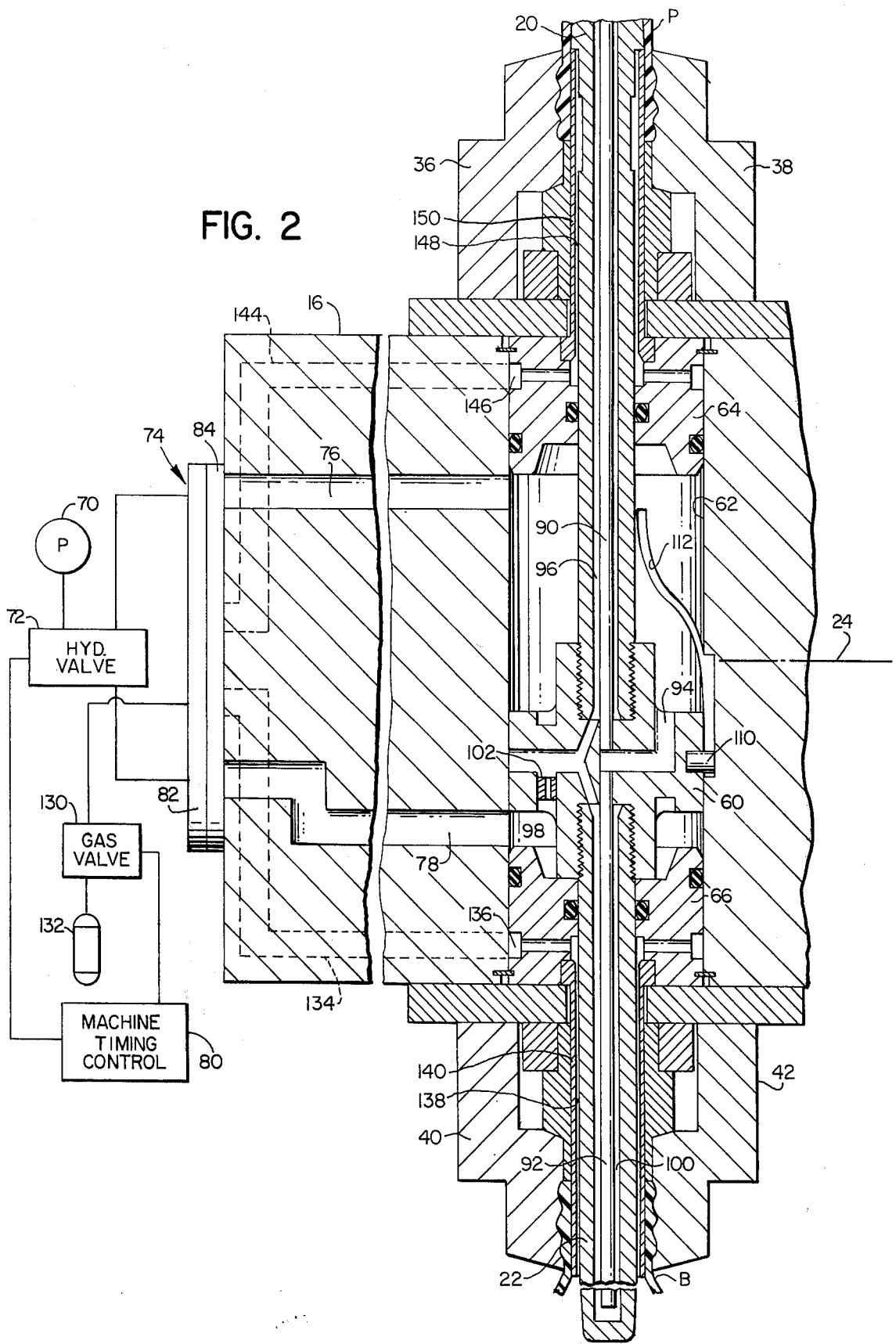
FIG. 2 is an enlarged cross-sectional view showing the rotatable head of the injection blow molding machine in FIG. 1. in greater detail together with the machine controls.

FIG. 2 illustrates the details of the hydraulic mechanism including the piston 60 and cylinder bore 62 which reciprocates and rotates the parison pins 20 and 22. A pump 70 is connected through a hydraulic valve 72 and a rotatable coupling 74 with hydraulic channels 76 and 78 within the parison arm 16. The channels 76 and 78 lead respectively to opposite sides of the piston 60 in the cylindrical bore 62. The hydraulic valve 72 is a spool valve which controls the flow of hydraulic fluid from the pump to the opposite sides of the piston 60 and is connected with a machine timing control 80 to cause the piston 60 and the associated parison pins 20 and 22 to retract and extend at the appropriate times during a molding cycle. Specifically, the hydraulic valve 72 causes the parison pin 20 to extend and the parison pin 22 to simultaneously retract after the pin 20 leaves the parison mold and the pin 22 leaves the blow mold. The arm 16 rotates about the axis 24 until the pin 20 is placed between the open halves 40, 42 of the blow mold, and the pin 22 is placed between the open halves 38 of the parison mold. The retraction of the pin 22, and correspondingly, the extension of the pin 20 should be completed before the pin is placed between the halves of the parison mold to avoid any interference of the pin and mold. During such rotation of the arm, the stationary plate 82 and the rotatable plate 84 of the coupling 74 maintain the appropriate fluid communication between the channels 76 and 78 in the rotating arm and the respective ports of the stationary valve 72.

After the parison P has been placed in the blow mold on the parison pin 20 and has been blown to the final form of the bottle B, the blow mold opens, the blown bottle B is stripped from the pin and the pin is returned to the parison mold in the same manner as pin 22 described immediately above. At the same time, the pin 22 with a parison mounted thereon moves from the parison mold to the blow mold in the same manner as pin 20 described above. Thus, in this phase of the molding operation, the hydraulic valve 72 extends the parison pin 22 moving toward the blow mold. The stationary plate 82 and the rotatable plate 84 of the coupling 74 maintain the desired communication between the channels 76 and 78 and the hydraulic valve 72 until the pins 20 and 22 reach the respective molds. It will be understood that the coupling 74 may be replaced by flexible hydraulic hoses if the rotation of the parison arm 16 is reversible and limited to 180°.

It will be observed in FIGS. 1 and 2 that each of the parison pins 20 and 22 is hollow. A cooling tube 90 extends coaxially within the parison pin 20 from the piston 60 to a point close to the free end of the pin 20. Similarly, a cooling tube 92 extends coaxially within the parison pin 22 from the piston 60 to the free end of the pin 22. The cooling tube 90 is hollow and communicates at its base end with a port 94 at one side of the piston 60 and at its outer end with an annular channel 96 between the cooling tube 90 and the interior walls of the pin 20. The cooling tube 92 is also hollow and also communicates at its base end with the port 94 and at its outer end with an annular channel 100 between the tube 92 and the interior walls of the hollow pin 22. Both of the annular channels 96 and 100 communicate at the base ends of the pins with a port 98 at the side of the piston 60 opposite the port 94. The cooling tubes 90 and 92 in cooperation with the ported piston 60 and the hollow parison pins 20 and 22 provide a means for controlling or adjusting the temperature of the parison pins by allowing the hydraulic fluid to circulate through the pins. By heating or cooling the hydraulic fluid, and holding the hydraulic valve 72 partially open to maintain flow through the pins, the temperature of the parison pins can be raised or lowered and, correspondingly, the temperature of the parison can be regulated at a temperature which is most advantageous for the stretching and rotation of the parison as it is moved toward the blow mold. Preferably the manifold plates 82 and 84 have porting which maintains communication between the channels 76 and 78 when the parison pins 20 and 22 are located in the parison and blow mold and thus the temperature of the pins may also be controlled while the pins dwell within the molds. If necessary, an orifice 102 may be included in the hydraulic flow path through the piston 60 and pins 20 and 22 in order to develop the necessary pressure differential across the piston and thereby reciprocate the parison pins within the bore 62 as described.

In order to produce rotation of a parison pin and a corresponding twisting of the parison as it is moved from parison to the blow mold, means are provided for rotating the piston 60. Such means comprises a tang 110 mounted in the piston 60 and a helical groove 112 cut in the wall of the cylindrical bore 62 and engaged by the tang. It will be understood that the displacement of the piston through the bore is, accordingly, accompanied by a corresponding rotation of the piston as the tang 110 travels along the helical groove 112. The tang and groove generate the desired rotation of the parison pins 20 and 22 during the stretching of a parison on either one of the pins.

It will be noted that the neckring segments 36 and 38 or 40 and 42 do not rotate or move relative to the parison arm 16 during the stretching and twisting motions of the parison. To the contrary, the neckring segments secure the finish or neck portion of the parison to the parison arm and extension and the rotation of the parison pin thus causes the remaining portion of the parison to be stretched and twisted relative to the finish. During such distortions of the parison, the molecules in the settable material forming the parison tend to line up with the directions in which the material is distorted. Controlling the arrangement of the molecules is advantageous since it allows the molecular structure in the blown bottle to be regulated for greater strength. The specific amounts of stretching and twisting and the ratio of stretching and twisting may vary for specific configurations of the bottle B.

When the parison has reached the blow mold 18, the mold halves 50 and 52 close on the parison and lock up. A gas valve 130 admits an inert gas such as carbon dioxide from a storage tank 132 through the manifold coupling 74 to a gas channel 134 in the parison arm 16. The gas channel 134 connects with an annular port 136 in the cylinder end 66 and the gases are directed through the cylinder end into a plurality of gas channels formed by grooves 138 in a sleeve 140 surrounding the parison pin 122. The sleeve 140 is captured fixedly on the parison arm 16 by the cylinder end 66 and thus the passageways formed by the grooves 138 open within the parison at a point between the finish and the free end of the pin. Thus, the gas admitted by the valve 130 enters the parison and such gas is used to blow or expand the parison to its final form within the blow mold 18.

A similar gas channel 144 in the parison arm 16 leads to an annular port 146 in the cylinder end 64 and delivers gas to the grooves 148 of a sleeve 150 surrounding the parison pin 20. However, the channel 144 and the channel 134 communicate with the gas valve 130 only after the parison and corresponding sleeve associated with the channel are removed from the parison mold due to the porting within the manifold plates 82 and 84. Thus, inadvertent expansion of the parison pin cannot take place. If desired, the porting of the manifold plates may permit preliminary expansion of the parison during the last portion of the indexing motions which invert the parison and place it in the cavity of the blow mold but rotation of the pins 20 and 22 and twisting of the parison should be completed before the blowing begins. Energization of the gas valve 130 like the hydraulic valve 72 is regulated by the machine timing control 80 and takes place during that portion of a molding operation when the parison is approaching or within the blow mold.

It will be noted in particular from FIG. 1 that the parison pins are extended to a length approximately equal to the axial length of the blow mold 18. Thus at the beginning of the blow operation, a short thick-walled parison formed in the parison mold 12 has been stretched into a tall, thin-walled parison suitable for blowing and the parison has an axial length which is substantially greater than that which can be accommodated by the parison mold. Furthermore, when the parison is subsequently expanded, the distortions of the settable material forming the parison occur in the circumferential direction and the molecular alignment, to an extent, follows such distortions. Thus, between the stretching of the parison in the axial direction, the twisting of the parison and the expansion of the parison, a desirable mixing of the molecular orientations can be produced to provide maximum strength.

In summary, the molding method and apparatus described above permit the parison to be stretched, twisted, and expanded to develop a finished bottle with great strength. Furthermore, the injection blow molding of bottles which have relatively large dimensions compared to their diameters is made possible without utilizing a parison mold having comparable dimensions. Thus, the injection blow molding machine has a lower overall height and the resulting product is stronger than that from a conventional machine.

While the present invention has been described in a preferred embodiment, it should be understood that further substitutions and modifications can be made without departing from the spirit of the invention. For example, although hydraulic actuating means have been disclosed for reciprocating the parison pins with respect to the parison arm, it will be readily appreciated that other pneumatic, mechanical or electrical actuating means may be provided on the arm to produce the same movement of the pins. Furthermore, the means for controlling the temperature of the parison pins during the molding operation may utilize means other than the hydraulic fluid which is circulated through the pins. Thus, by way of example, the pins may be retracted and extended respectively by means of a gear rack and the pins may be heated by internal electric heaters. Accordingly, the present invention has been described in one embodiment by way of illustration rather than limitation.

We claim:
1. In an injection blow molding machine having an injection nozzle cooperating with a parison mold to inject a quantity of settable material into the mold cavity to form a parison and a blow mold having a cavity in which the parison is received from the parison mold and which blow mold cavity defines the shape of an article formed from the parison in a blowing operation, the improvement comprising:
 a parison arm movable in relation to the parison and blow molds;
 a parison pin mounted on the parison arm for movement relative to the arm along and about the longitudinal pin axis and movable with the arm relative to the cavities of the parison and blow molds, the parison being formed over the parison pin in the cavity of the parison mold;
 separable neckring segments forming a neckring mounted on the arm about the parison pin and engaging an end portion of the parison formed on the pin and operable to hold said end portion in a fixed position relative to said arm during movement of the parison with the pin and arm from the parison mold to the blow mold; and
 actuating means mounted on the parison arm and connected with the parison pin and operable to move the pin along and about the longitudinal pin axis relative to the parison arm for axially stretching and twisting the portion of the parison extending beyond the neckring segments during movement of the parison with the pin and arm from the parison mold to the blow mold.

2. The improvement of claim 1 wherein:
 the parison arm is a rotatable arm indexed 180° between the parison and blow molds.

3. The improvement of claim 1 wherein:
 the actuating means includes reciprocating actuating means for extending the parison pin in its longitudinal direction from the parison arm during movement from the parison mold to the blow mold and for retracting the pin during movement from the blow mold to the parison mold.

4. The improvement of claim 1 wherein:
 two parison pins are mounted on the parison arm, each pin being movable along and about its own longitudinal axis relative to the arm; and
 the actuating means comprises reciprocating means operatively connected with both of the parison pins for reciprocating the pins simultaneously relative to the arm.

5. The improvement of claim 4 wherein:
 the parison arm is rotatable about a fixed axis situated between the parison and blow molds;
 the two pins are mounted on the parison arm coaxially of each other on opposite sides of the rotatable arm and at 90° to the fixed axis.

6. The improvement of claim 1 wherein:
 means are mounted within the parison pin for adjusting the temperature of the pin and the settable material forming the parison on the pin.

7. The improvement of claim 6 wherein the temperature adjusting means comprises fluid tube for circulating fluid through the pins.

8. The improvement of claim 1 wherein the actuating means connecting with the parison pins includes means for extending the pin along the longitudinal pin axis and simultaneously rotating the pin about the longitudinal pin axis.

* * * * *